United States Patent Office 2,997,421
Patented Aug. 22, 1961

2,997,421
IODINE-HEAVY METAL HALIDE GERMICIDAL COMPOSITIONS
William A. Hosmer, Lee, Mass., Raymond L. Mayhew, Phillipsburg, N.J., and James P. Oelberg, Lebanon, Ind., assignors to General Aniline & Film Corporation, New York, N.Y., a corporation of Delaware
No Drawing. Filed Feb. 6, 1958, Ser. No. 713,543
6 Claims. (Cl. 167—17)

The invention here presented is a new composition of matter containing a nonionic surfactant substance characterized by the ability to form micelles in aqueous medium, which surfactant is also combined or compounded with iodine and with a heavy metal salt; a representative surfactant being the condensation product of nonylphenol with approximately 10 moles of ethylene oxide per mole of nonylphenol.

According to the present invention, it is now found that a very excellent detergent-disinfectant can be prepared from a surfactant of the type above outlined, into which there are compounded substantial quantities of iodine or other halogen and substantial quantities of mercury or other heavy metal. The resulting compound shows an undiminished detergent power as compared to the nonylphenol-ethylene oxide condensate alone; shows an excellent iodine type of disinfectant or antiseptic action, and an auxiliary highly potent and additional disinfecting action from the presence of the heavy metal whereby a powerful combined detergent and disinfectant action is obtained.

Thus the present invention provides a broadly new composition of matter in which there is utilized a potent surfactant substance containing substantial quantities of elemental iodine and additional heavy metal salt, such as mercuric chloride or other heavy metal salts and oxides. Other objectives and details of the invention will be apparent from the following description.

The first component of the composition of matter of the present invention is the surfactant substance, which is a polyoxyethylene glycol of an active hydrogen compound prepared as disclosed in U.S. 1,970,578 and 2,213,477. The preferred substance is the condensation product of nonylphenol and 9 or 10 moles of ethylene oxide. However, the number of carbon atoms in the substituent upon the phenol may vary between about 3 and about 15, and may be present as in the form of one or several substituents up to about 5. Similarly, the number of moles of ethylene oxide condensed with the alkylphenol may vary between about 4 and about 18 or 20. However, the surfactant is not limited even to this specific compound but any nonionic surfactants containing micelles is more or less satisfactorily useable. These substances are well shown in the article by Jelinek and Mayhew under the title of "Nonionic Surfactants" published in the Textile Research Journal, volume XXIV, No. 8, August 1954; wherein there are shown a considerable number of nonionic surfactants prepared from ethylene oxide condensed with many other substances. The characteristics of these surfactants are shown in detail in this article, and the contents of the article are incorporated hereinto, by reference.

The second component of the present composition of matter is preferably iodine per se, but the iodine may equally well be used in combination as iodine bromide or iodine chloride. Any of these substances readily react with the surfactant, merely by mixing the two together, which may be done with the dry substances merely by stirring or, better, milling the iodine and the surfactant together. Alternatively, the surfactant may be dissolved in water and the halogen may be suspended in the water solution of surfactant and the mixture stirred until the iodine is absorbed into the surfactant. The reaction proceeds at good speed and may be accelerated by moderate heating and by more vigorous agitation. However, the reaction will go to completion if the two substances are merely roughly mixed and allowed to stand. The time of reaction under such conditions, especially if the intermixture is poor, may amount to several weeks.

The third component, then, is a heavy metal or salt for which the preferred substance is mercuric chlorlide, in view of its very powerful antiseptic and disinfectant action. Alternatively, various other metals, metal oxides and metal salts may be used, depending upon the use to which the compound is to be put. Representative other metals are bismuth, lead, antimony, iron, copper, and the like, the whole list of heavy metals being more or less satisfactorily useable for various purposes. The metals may be incorporated as the free metal, especially mercury, in which case substantially greater amounts of the halogen are required. Preferably, however, the heavy metals are utilized as their halides, either chloride, bromide, or iodide, depending upon the characteristics desired in the compound. Similarly, the other heavy metals may be utilized in the free metal form or oxide, preferably in the finest possible state of subdivision, in which case greater quantities of iodine are required and considerable time for reaction is also required. Again, the preferred form for the other heavy metals is the halide, the chlorides, bromides and iodines being particularly suitable. In completing the compound, the metal or metal salt may be added to the surfactant-halide compound and intimately mixed. Heat may be employed to aid in the dissolution and formation of the complex. Alternatively, however, and especially in the case of the water soluble metal salts, the compound may be prepared by dissolving the surfactant-halogen composition in water and adding the metal salt either in water or in the dry form as desired. In either event, a homogeneous composition is readily obtained. However, as before, the reaction may be speeded by gentle heating.

In the event that a liquid surfactant is used, which is the form in which the lower molecular weight condensation of the alkylphenol and ethylene oxide type occur, the water-free material may be bottled or may be "built" by the addition of a wide range of other substances, including carboxymethyl cellulose and similar compounds together with sodium sulfate, sodium chloride, and the like, as desired, in order to permit the packaging of the material as a dry solid.

Thus the composition of matter of the present invention incorporates into a surfactant having micelles, a substantial portion of elemental iodine, which retains its elemental character and absorbs in the same surfactant a substantial proportion of a heavy metal salt which also largely maintains its primary characteristics, whereby there is produced an extremely potent detergent-disinfectant.

The following examples show the preferred procedure for practicing the invention but are not intended to limit the scope of the appended claims.

*Example 1*

A mixture was prepared consisting of a condensate of:

250 parts by weight of nonylphenol and 10 moles ethylene oxide, with 25 parts of iodine by mixing the two together.

The resulting mixture was a dark brown liquid. To this there was then added 10 parts by weight of mercuric chloride, the mixture being well stirred until the mercuric chloride had been completely dissolved.

This mixture was heated for 1 hour at 100° C. At this time, all of the mercuric chloride had dissolved and the resultant product was a brown viscous liquid.

These compounds are excellent germicides. They have excellent bactericidal activity because of the iodine present, and strong bacteriostatic power, even in the presence of organic matter such as human blood serum, because of the heavy metal salt. They appear to be superior to any of the products now available.

This compound was found to have a phenol coefficient of 135 for *Salmonella typhosa*, while the iodine nonionic, without the heavy metal salt, had a phenol coefficient of 14.

Example 2

A similar mixture was prepared consisting of:

500 parts of nonylphenol condensed with 10 moles ethylene oxide, and thereafter mixed with 5 parts by weight of iodine, the mixture being prepared in the dry by prolonged stirring. To this there were then added:

11.6 parts by weight of yellow mercuric oxide and 2 g. of sodium hydroxide in 2 ml. of water.

This mixture was heated for 2 hours at 100° C. At the end of this time, all of the mercuric oxide was reacted and the resultant product was a brown viscous liquid. Variations in the ratios of iodine, mercuric oxide, or sodium hydroxide, and in temperature are possible.

This compound was found to have a phenol coefficient of 200 when tested against *Salmonella typhosa* at 20° C. The iodine nonionic has a phenol coefficient of 14. This means that the germicidal activity has been increased by the addition of the heavy metal oxide.

Example 3

The procedure of Example 1 was followed in preparing the following nonionic surfactant—iodine compositions:

|  | Parts |
|---|---|
| (a) Nonylphenol+10 E.O. | 450 |
| Iodine | 50 |
| Mercury | 10 |
| 10% aqueous sodium hydroxide | 11 |
| (b) Diisobutylphenol+20 E.O. | 600 |
| Iodine bromide | 50 |
| Mercuric chloride | 4 |
| (c) Tridecyl alcohol (oxo process)+10 E.O. | 150 |
| Iodine | 30 |
| Mercuric oxide | 4 |
| (d) Polypropylene glycol (M.W. 1800)+50 E.O. | 80 |
| Iodine | 8 |
| Mercuric chloride | 5 |
| (e) Lauryl alcohol+8 E.O. | 150 |
| Iodine | 25 |
| Mercuric chloride | 8 |

These five compositions of matter all showed the same outstanding power as disinfectants, as well as a good detergent action; a most unusual and unexpected combination of properties.

Example 4

The procedure of Example 1 was repeated, substituting cupric chloride as the heavy metal. The resulting compound also was found to be an excellent biocide which was especially potent against fungi and marine growths.

Example 5

Similarly, an arsenic compound, either as arsenic trioxide or as the halide, may be substituted for the mercury compound in Example 1 to produce still another type of biocidal detergent which is especially potent against some of the parasitic infection of plants, for which purpose the compound may be sprayed on in water solution, the detergent serving to release the hold of the parasites upon the plants and the arsenic serving to kill the released parasites.

Example 6

The compounds according to this invention are excellent as additives to machine tool cutting oils which tend to become infected after prolonged use and to cause troublesome infections on the machine tool operator's skin. These detergents are readily soluble in cutting oils generally and they serve as excellent reinforcers of the cutting oil action, permitting of higher cutting speeds and longer usage of tools between sharpenings. The amount used may range from a small fraction of 1% on the amount of oil to a very substantial but minor proportion, depending upon the character of oil used and the service required.

Example 7

The compounds also serve as excellent antifouling agents in paper-mill stuff-chests. A small amount added at some convenient point in the pulp processing serves to destroy all trace of fouling growths and keeps the stuff-chest material completely sterile; and at the same time it is completely removed when the paper is flowed upon the "wire"; it being water soluble, passes through the wire and away from the pulp along with the white water.

Example 8

25.0 g. of a composition of 90% by weight of the condensate of 1 molar proportion nonyl phenol with 10 molar proportions of ethylene oxide and 10% by weight of iodine USP resublimed, 1.0 g. ferric chloride, anhydrous.

Mixture was prepared in a 150 ml. beaker and placed on a steam bath, occasional stirring during 2 hours on the bath effected a clear solution. This solution remained clear on cooling.

Example 9

25.0 g. of a composition of 90% by weight of the condensate of 1 molar proportion nonyl phenol with 10 molar proportions of ethylene oxide and 10% by weight of iodine USP resublimed, 1.3 g. cupric chloride. $CuCl_2 \cdot 2H_2O$.

Solubility was effected in a manner similar to above. This solution likewise remainded clear on cooling.

Thus the composition of matter provides a material containing a surfactant, iodine, and a heavy metal compound in which the iodine and heavy metal are absorbed into the surfactants in a unique fashion, by which the germicidal and bactericidal properties are substantially enhanced.

While there are above disclosed but a limited number of embodiments of the composition of matter of the present invention, it is possible to provide still other embodiments without departing from the inventive concept herein disclosed, and it is therefore desired that only such limitations be imposed upon the appended claims as are stated therein or required by the prior art.

The invention claimed is:

1. A water-soluble germicidal composition consisting essentially of a major amount of a nonionic surface active agent having a polyglycol ether group and an effective minor amount of iodine up to about 20% by weight of said nonionic surface active agent, and a minor amount up to about 5% by weight of said nonionic surface active agent of a heavy metal halide.

2. A composition as defined in claim 1, wherein the heavy metal compound specified is mercuric chloride.

3. A composition as defined in claim 1, wherein the heavy metal compound specified is cupric chloride.

4. A composition as defined in claim 1, wherein the heavy metal compound specified is ferric chloride.

5. A composition as defined in claim 1, wherein the nonionic surface active agent specified is the condensate of an alkylphenol with ethylene oxide.

6. A composition as defined in claim 1, wherein the nonionic surface active agent specified is a condensate of a fatty alcohol with ethylene oxide.

References Cited in the file of this patent

UNITED STATES PATENTS

| | | |
|---|---|---|
| 1,731,551 | Todd | Oct. 15, 1929 |
| 2,067,674 | Kimerlin | Jan. 12, 1937 |
| 2,287,724 | Bush | Jan. 23, 1942 |

FOREIGN PATENTS

| | | |
|---|---|---|
| 703,091 | Great Britain | Jan. 27, 1954 |

OTHER REFERENCES

Gershenfeld, Soap and Chem. Spec. 31:4 pp. 139–141 and 195, April 1955.

Allawata et al.: J.A.P.A. (Sci. Ed.) XLII:7 pp. 396, 401, July 1953.

U.S. Dispensatory, 22nd ed., 1937, pp. 533–7.